April 2, 1957 R. W. ANDERSON 2,787,301
TABLE SAW MITER GAUGE
Filed Nov. 4, 1954
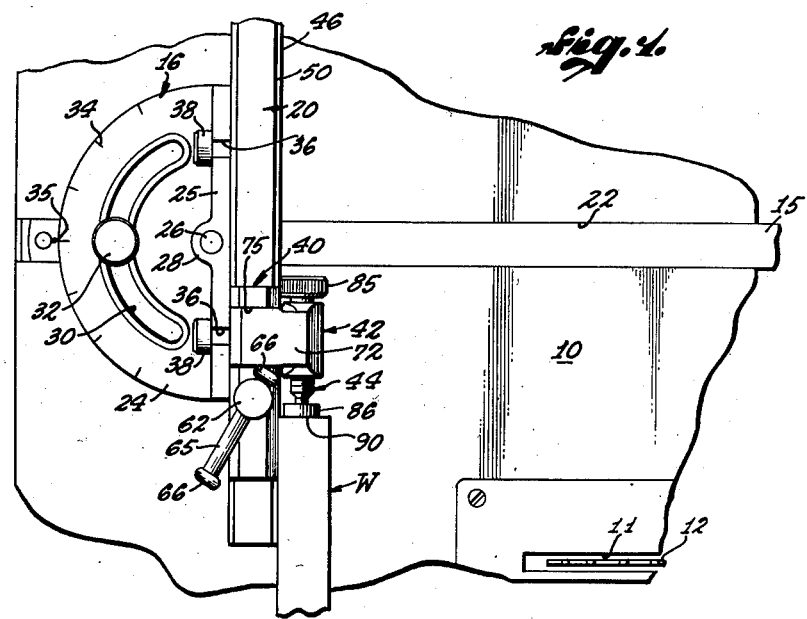
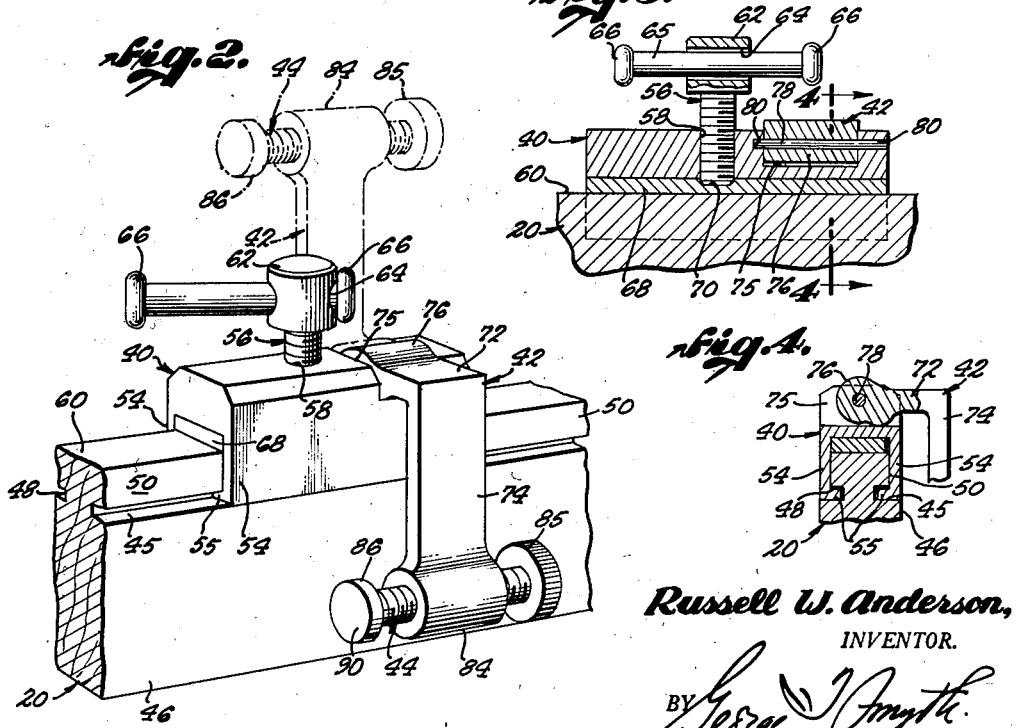
Russell W. Anderson,
INVENTOR.
BY
ATTORNEY.

United States Patent Office 2,787,301
Patented Apr. 2, 1957

2,787,301

TABLE SAW MITER GAUGE

Russell W. Anderson, Los Angeles, Calif.

Application November 4, 1954, Serial No. 466,724

7 Claims. (Cl. 143—169)

This invention relates to circular table saws and particularly refers to improvements to a table saw miter gauge. A miter gauge of the type to which the invention pertains includes a guide bar that is slidable longitudinally in a groove in the top of the table in spaced parallel relation to the circular saw. The slide bar carries a lateral extension against which work pieces may be held for guided movement against the saw. The extension is mounted on the slide bar by a protractor bracket which may be adjusted to position the extension at selected angles relative to the slide bar to result in sawing the workpieces at corresponding angles. A sawing operation is carried out by holding a workpiece by hand against the forward face of the extension and moving the miter gauge assembly together with the work piece towards the saw.

A conventional miter gauge predetermines with close accuracy the angles at which the workpieces are cut off and make it possible to saw any number of successive workpieces at precisely the same angle. If it is required, however, that the successive workpieces be cut accurately to uniform length, care must be exercised. The successive workpieces must be accurately positioned against the miter gauge extension with the end of each successive workpiece at exactly the same point on the extension. For this purpose it is common practice to place a reference mark either on each workpiece or on the miter gauge extension, but the use of such marks does not assure accurate uniformity in the length of the finished workpieces because the successive pieces must be positioned by sight and some degree of error is inevitable.

The present invention assures the desired uniformity in length of the successive workpieces by providing the miter gauge extension with an adjustably mounted stop against which the successive workpieces may abut for accurate positioning relative to the saw. Certain problems arise in the provision of such a stop, however, and the invention is directed to practical solutions for these problems.

One of the problems is to provide a stop that will be out of the way when not needed and at such time will leave the whole area of the front face of the miter gauge extension clear to cooperate with workpieces. This problem cannot be solved with complete satisfaction by mounting a stop member on the extension in a removable manner. In the first place, time and labor would be required to mount the stop on the extension by hand prior to each use and later to remove the stop by hand when not needed. In the second place, there is always a possibility of a removable stop being misplaced or lost.

The present invention solves this problem by mounting a slide body permanently on the miter gauge extension for movement longitudinally thereof and by pivotally mounting a stop member on the slide body for movement between a forward effective position and a rearward retracted position. A feature of the preferred practice of the invention is that the slide body does not intercept the plane of the front face of the miter gauge extension and that the stop member in its retracted position lies well behind this plane. Thus to clear the front face of the miter gauge extension for normal use with work pieces, it is necessary merely to shift the stop member from its forward effective position to its rearward ineffective position. In this regard a further feature of the preferred practice of the invention is that the stop member is constructed to gravitate to either of its two positions. Such an arrangement causes the stop member to remain in either of its two positions without the necessity of latching or holding the stop member.

Another problem that arises is to provide for precision in the positioning of the stop member relative to the miter gauge extension. The slide body that carries the stop member is, of course, adapted to be fixed selectively relative to the miter gauge extension and for this purpose is provided with suitable clamp means to releasably engage the extension. It has been found too difficult and time consuming, however, to clamp the slide body in position accurately in those instances where close precision is required in the sawing of the workpieces to length.

The invention solves this second problem by mounting a stop screw on the stop member with the axis of the stop screw positioned longitudinally of the miter gauge extension. This arrangement makes possible a simple procedure in which the slide body is first clamped at an approximately correct position to place the stop screw in approximately the correct position and then the stop screw is rotated to the precise longitudinal position desired.

A feature of the invention is that while it may be incorporated in the construction of the miter gauge of a table saw at the factory where the table saw is produced, it may also be sold as an accessory or adaptor to be incorporated in existing table saws. Such an accessory may comprise a miter gauge extension member equipped with a slide body and pivoted stop member. It is a simple matter to substitute one extension for another in a miter gauge assembly since the conventional extension member is simply held in position on the protractor bracket by screws.

The various features and advantages of the invention will be apparent from the following detailed description considered with the accompanying drawing.

In this drawing which is to be regarded as merely illustrative:

Figure 1 is a fragmentary plan view of a table saw equipped with the preferred embodiment of the invention;

Figure 2 is a perspective view showing how the slide body and stop member are mounted on the miter gauge extension;

Figure 3 is a longitudinal vertical section of the slide body and the associated portion of the miter gauge extension; and Figure 4 is a transverse section taken as indicated by the line 4—4 of Figure 3.

Figure 1 in the drawing shows a portion of a table saw, the table 10 of which has the usual slot 11 in which is mounted the usual circular saw 12. Movably mounted on the table 10 is a miter gauge which is in the usual form of an assembly comprising a guide bar 15, a protractor bracket 16 and a miter gauge extension 20.

The guide bar 15 is slidably mounted in the usual manner in a guide channel or groove 22 in the table 10 for longitudinal movement to carry the miter gauge extension 20 in a path toward and away from the circular saw 12. The protractor bracket 16 is of angular configuration with a flat base 24 and an upright flange 25. The protractor bracket 16 is pivotally mounted on the guide bar 15 by a pivot pin 26 that extends upward through an enlargement 28 in the bracket flange 25.

The base 24 of the protractor bracket 16 is formed in a well known manner with an arcuate slot 30 to permit the protractor bracket to be releasably engaged by a thumb screw 32 that is threaded into the guide bar 15. The thumb screw 32 may be tightened to releasably secure the protractor bracket at selected angles relative to the guide bar. The base 24 of the protractor bracket is provided with the usual scale 34 and the guide bar 15 is provided with the usual index mark 35 for guidance in the adjustment of the protractor bracket at desired angles relative to the guide bar. The upright flange 25 of the protractor bracket 16 is formed with two vertical slots 36 which extend to the top edge of the flange and receive suitable screws 38 for holding the miter gauge extension 20.

The structure described to this point is conventional and the miter gauge extension 20 is conventional except for the fact that it is suitably adapted for cooperation with a slide body 40 that is provided by the invention. The slide body 40 carries a suitable stop member 42 that is movable between an effective position and a retracted position. Preferably the stop member 42 carries a stop screw 44.

The miter gauge extension 20 and the slide body 40 are adapted to cooperate with each other in any suitable manner that permits the slide body to be moved adjustably along the length of the extension. In the present construction, for example, the miter gauge extension is provided with a longitudinal groove 45 in its forward face 46 and a similar longitudinal groove 48 in its rearward face to serve as track means for the slide body 40. The portion of the miter gauge extension 20 above the forward longitudinal grove 45 is cut away so that the forward surface 50 of the miter gauge extension that lies above the forward groove 45 is offset rearward from the plane of the forward face 46.

This cross sectional configuration for the miter gauge extension 20 permits the slide body 40 to be shaped and dimensioned to avoid intercepting the plane of the forward guide face 46 of the extension. In this instance the forward face 52 of the slide body 40 is substantially flush with the forward guide face 46 and may be regarded as an extension thereof. Preferably the rearward face of the slide body 40 is also substantially flush with the rearward face of the miter gauge extension 20 so that the slide body constitutes, in effect, a horizontally movable vertical extension of the miter gauge extension 20.

In this particular embodiment of the invention, the slide body 40 is a metal block formed with downwardly extending sidewalls 54 to straddle the upper portion of the miter gauge extension 20 and each of these side walls 54 terminates in an inwardly directed longitudinal flange 55 that slidingly engages the corresponding longitudinal groove 45 or 48. It can be seen that the two longitudinal grooves 45 and 48 provide downwardly facing longitudinal surfaces or shoulders and the longitudinal flanges 55 of the slide body cooperate with these downwardly facing shoulders to prevent separation of the slide body from the miter gauge extension when the slide body is moved along the length of the extension.

Any suitable means may be provided to releasably secure the slide body 40 to the miter gauge extension 20 at selected positions longitudinally of the extension. In the present construction, a suitable clamp screw 56 extends vertically through a threaded bore 58 in the slide body 40 to exert clamping pressure against the upper surface 60 of the miter gauge extension 20. The head 62 of the clamping screw 56 is formed with a transverse bore 64 in which is slidingly mounted a short rod 65 with enlargements 66 at each end to serve as a handle for rotating a screw in a well known manner. Preferably a suitable pressure pad is interposed below the leading end of the clamp screw 56. Such a pressure pad may comprise a longitudinal plate 68 of the same dimension in plan as the slide body 40, this plate being formed with a shallow recess 70 on its upper side to seat the leading end of the clamp screw 56. It is apparent that tightening of the clamp screw 56 will result in pressing the pressure plate 68 against the top surface 60 of the miter gauge extension 20 and the consequent reaction will cause the longitudinal flanges 55 of the slide body 40 to exert corresponding upward pressure against the walls of the two longitudinal grooves 45 and 48 to immobilize the slide body in an effective frictional manner.

In the present embodiment of the invention, the stop member 42 is of angular configuration, being formed with a short leg 72 and a long leg 74. The short leg 72 is seated with a snug fit in a transverse channel 75 in the upper side of the slide body 40 and the end of the short leg is formed with an enlargement 76 to receive a suitable pivot pin 78. The pivot pin 78 fits snugly into aligned bores 80 on opposite sides of the transverse channel 75 and permits the stop member 42 to swing between a forward effective position shown in solid lines in Figure 2 and a rearwardly retracted position shown in broken lines.

It is contemplated that the short leg 72 will be shaped and dimensioned to cooperate with the slide body 40 to hold the long leg 74 in a forward effective position spaced from the guide surface 46 of the miter gauge extension and parallel to that surface as indicated in Figure 4 For this purpose the short leg 72 of the stop member 42 may be formed with a slight enlargement or projection 82 to rest against the bottom surface of the transverse channel as may be seen in Figure 4. At the alternate retracted position of the stop member 42, shown in broken lines in Figure 2, the short leg 72 of the stop member rests against the bottom surface of the transverse channel 75 to hold the long leg 74 upright as shown. It will be noted that in each of these two alternate positions of the stop member 42, the center of gravity of the stop member lies in a direction from the pivot end 78 to cause the stop member to maintain its position.

The end of the longer leg 74 of the stop member 42 may be formed with an enlargement 84 through which the stop screw 44 is threaded. In the construction shown, the stop screw 44 has a knurled head 85 and the leading end of the stop screw is formed with an enlargement 86 to provide suitable leading stop face 90.

The manner in which the invention serves its purpose may be readily understood from the foregoing description. Figure 1 shows how a workpiece W may be placed against the forward guide surface 46 of the miter gauge extension 20 for guided movement against the circular saw 12 with the end of the workpiece in abutment against the enlargement 86 at the end of the stop screw 44.

It is apparent that the procedure for adjusting the stop arrangement for correct positioning of the workpiece consists first in moving the slide body 40 to the approximate position for cooperation with the workpiece W and then in rotating the stop screw 44 precisely to the desired position. It is apparent that only a single simple hand movement is required to shift the stop member 42 to either of its two positions and that when the stop member is in its rearward retracted position it is out of the way to permit full freedom in the normal use of the miter gauge. It is further apparent that the miter gauge extension 20 with the slide body 40 mounted thereon may be sold as an article of commerce to replace conventional miter gauge extensions on circular table saws.

Although the now preferred embodiment of the present invention has been shown and described herein, it is to be understood that the invention is not to be limited thereto, for it is susceptible to changes in form and detail within the scope of the appended claims.

I claim:

1. In a miter gauge for a circular table saw, the combination of: a miter gauge extension having longitudinal guide grooves on its forward and rearward faces respectively and having its portion above its forward groove offset rearward from its forward face; a slide body rearward of the plane of said forward face straddling said upper portion of the extension in engagement with said grooves; screw means extending downward through said slide body to exert pressure against the top of said extension to immobilize the slide body at selected positions on the extension; a pressure pad interposed between said screw means and the top of said extension; an annular stop member having a short leg and a long leg, said short leg being pivotally connected to the top of said slide body, said stop member being movable while said slide body is immobilized between an effective position with said short leg directed forward and with said long leg directed downward adjacent said forward face of said extension and a retracted position with said short leg resting rearward on said body to hold said long leg upright in a position rearward said forward face; and a stop screw threaded into said long leg longitudinally of said extension.

2. A miter gauge as set forth in claim 1 in which said slide body is formed with a transverse channel on its upper side and in which said short leg of the stop member fits snugly into said channel to hold the stop member against relative movement longitudinally of the extension.

3. A miter gauge as set forth in claim 1 in which said short leg is shaped and dimensioned to rest on said slide body in a position to hold said longitudinal leg spaced forward from said forward face of extension at said effective position of the stop member.

4. An elongated saw-table fixture for gauging workpieces to be cut by a driven circular saw in a cutting operation involving relative movement between the saw and the elongated fixture along a path intercepting the longitudinal axis of the fixture, said elongated fixture comprising: an elongated member having a forward longitudinal planar side surface facing in the general direction of the saw for face-to-face contact with workpieces, said elongated member having a longitudinal guide portion spaced rearward from the plane of said forward side surface; a slide body slidably mounted on said guide portion for movement longitudinally thereof, said slide body being in positive engagement with said guide portion to prevent separation therefrom during its sliding movement therealong, said slide body lying entirely rearward of the plane of said forward side surface; means carried by said slide body for releasable engagement with said elongated member to immobilize the slide body at selected positions along the length of the elongated member; a stop member having a first leg and a second leg at an angle relative to the first leg; means pivotally connecting said first leg to said slide body for swinging movement of the stop member relative to the slide body between a forward effective stop position extending forward from said plane and a retracted position wholly rearwardly of said plane, said second leg extending downward along said forward surface at said effective position of the stop member.

5. A combination as set forth in claim 4 which includes an adjustable stop screw threaded into said second leg of the stop member in a position to extend parallel with said planar surface for abutment against the ends of workpieces when the stop member is in its effective position.

6. An elongated saw-table fixture for gauging workpieces to be cut by a driven circular saw in a cutting operation involving relative movement between the saw and the elongated fixture along a path intercepting the longitudinal axis of the fixture, said elongated fixture comprising: an elongated member having a forward longitudinal planar side surface facing in the general direction of the saw for face-to-face contact with workpieces, said elongated member having an upper longitudinal guide portion above said forward surface and spaced rearwardly from the plane of said forward side surface, said elongated member having a downwardly facing longitudinal shoulder; a slide body slidably mounted on said guide portion for movement longitudinally of said elongated member, said slide body lying entirely rearward of the plane of said forward surface, said slide body having a portion positioned for engagement with said longitudinal shoulder to prevent separation of the slide body from the elongated member during the sliding movement of the slide body; means carried by said slide body for frictional engagement with said elongated body to immobilize the slide body at selected positions along the length of the elongated member; a stop member having a first leg and a second leg at an angle relative to the first leg; means pivotally connecting said first leg to said slide body for swinging movement of the stop member relative to the slide body between a forward effective stop position extending forward from said plane and a retracted position wholly rearward of said plane, said second leg extending downward along said forward surface at said effective position of the stop member.

7. An elongated saw-table fixture for gauging workpieces to be cut for a driven circular saw in a cutting operation involving relative movement between the saw and the elongated fixture along a path intercepting the longitudinal axis of the fixture, said elongated fixture comprising: an elongated member having a forward longitudinal planar side surface facing in the general direction of the saw for face-to-face contact with workpieces, said elongated member having an upper longitudinal guide portion above said forward surface and spaced rearwardly from the plane of said forward side surface, said elongated member having a downwardly facing longitudinal shoulder; a slide body slidably mounted on said guide portion for movement longitudinally of said elongated member, said slide body lying entirely rearward of the plane of said forward surface, said slide body having a portion positioned for engagement with said longitudinal shoulder to prevent separation of the slide body from the elongated member during the sliding movement of the slide body; means carried by said slide body for pressure downward against said elongated member to create upward pressure by said portion of the slide body against said longitudinal shoulder to immobilize the slide body at selected positions on the elongated member; a stop member having a first leg and a second leg at an angle relative to the first leg; means pivotally connecting said first leg to said slide body for swinging movement of the stop member relative to the slide body between a forward effective stop position extending forward from said plane and a retracted position wholly rearward of said plane, said second leg extending downward along said forward side surface at said effective position of the stop member; and an adjustable stop screw threaded into said second leg of the stop member in a position to extend parallel with said forward side surface for abutment against the ends of workpieces when the stop member is in its effective position.

References Cited in the file of this patent

UNITED STATES PATENTS

| | | |
|---|---|---|
| 1,459,873 | Blackburn | June 26, 1923 |
| 1,574,445 | Robinson | Feb. 23, 1926 |
| 2,010,882 | Ocenasek | Aug. 13, 1935 |
| 2,285,897 | Campbell | June 9, 1942 |
| 2,667,190 | Delano | Jan. 26, 1954 |
| 2,696,854 | Woodruff | Dec. 14, 1954 |